United States Patent
Zeung

(10) Patent No.: US 9,116,678 B2
(45) Date of Patent: Aug. 25, 2015

(54) I/O MODULE WITH POWER-UNINTERRUPTIBLE USB PORT

(75) Inventor: Ping-Shun Zeung, New Taipei (TW)

(73) Assignee: I/O Interconnect, Ltd., Santa Ana, CA (US)

( * ) Notice: Subject to any disclaimer, the term of this patent is extended or adjusted under 35 U.S.C. 154(b) by 402 days.

(21) Appl. No.: 13/103,136

(22) Filed: May 9, 2011

(65) Prior Publication Data
US 2012/0272074 A1 Oct. 25, 2012

Related U.S. Application Data

(60) Provisional application No. 61/478,477, filed on Apr. 22, 2011.

(51) Int. Cl.
*G06F 1/26* (2006.01)
*G06F 13/38* (2006.01)

(52) U.S. Cl.
CPC .............. *G06F 1/266* (2013.01); *G06F 13/385* (2013.01); *G06F 2213/0042* (2013.01); *G06F 2213/3804* (2013.01)

(58) Field of Classification Search
CPC .................................................... G06F 1/3203
USPC ........................................................ 713/300
See application file for complete search history.

(56) References Cited

U.S. PATENT DOCUMENTS

| | | | | |
|---|---|---|---|---|
| 6,774,604 B2* | 8/2004 | Matsuda et al. | | 320/110 |
| 6,798,173 B2* | 9/2004 | Hsu | | 320/134 |
| 6,916,208 B2* | 7/2005 | Chen et al. | | 439/639 |
| 7,489,974 B2* | 2/2009 | Numano | | 700/22 |
| 7,624,202 B2* | 11/2009 | Monks et al. | | 710/15 |
| 7,688,037 B2* | 3/2010 | Huh | | 320/138 |
| 7,791,319 B2* | 9/2010 | Veselic et al. | | 320/158 |
| 7,987,376 B2* | 7/2011 | Inoue et al. | | 713/300 |
| 8,069,356 B2* | 11/2011 | Rathi et al. | | 713/300 |
| 8,230,243 B2* | 7/2012 | Fujiwara | | 713/310 |
| 2006/0035527 A1* | 2/2006 | Numano | | 439/668 |
| 2008/0313477 A1* | 12/2008 | Numano | | 713/321 |
| 2011/0047393 A1* | 2/2011 | Tracy et al. | | 713/300 |

* cited by examiner

*Primary Examiner* — Suresh Suryawanshi

(57) ABSTRACT

An I/O module such as a card reader module for connecting a computer having a first and second USB port is disclosed. The I/O module includes an I/O controller connecting the first USB port, a charging controller connecting the second USB port and a third USB port connecting the charging controller. The I/O controller determines what a power state of the computer is according to communication between the first USB port and the I/O controller and then sends a control signal depending upon the power state to the charging controller. The charging controller changes the third USB port into a pure charger mode without data transfer or a normal mode with both charging and data transfer capabilities according to the control signal.

6 Claims, 2 Drawing Sheets ically, the I/O module 1 is an independent piece from the motherboard 20 and is installed in a housing of the computer 2. Practically, the I/O module 1 may be deemed as a part of the computer 2 once the I/O module 1 has been installed in the computer 2.

I/O MODULE WITH POWER-UNINTERRUPTIBLE USB PORT

This application claims the benefit of U.S. Provisional Application No. 61/478,477, filed Apr. 22, 2011.

BACKGROUND OF THE INVENTION

1. Technical Field

The invention relates to a universal serial bus (USB) port attached to a host computer, particularly to a USB port with uninterruptible power to provide USB device charging functionality when the host computer is in a standby mode.

2. Related Art

For many electronic devices such as personal computers (PCs), cellular phones and digital cameras, universal series bus (USB) has become a standard connection port. Unlike the older connection standards RS-232 or Parallel port, USB connectors also supply electric power, so many devices connected by USB do not need a power source of their own. For some portable electronic devices with built-in batteries, a USB port may charge the battery and make data communication simultaneously when an electronic device is connected to a computer via the USB port. Besides, A USB port also can be used to only serve as a power outlet without data communication.

Modern computers must adopt the Advanced Configuration and Power Interface (ACPI) specification for power management. In the ACPI, there are six power states: S0, S1, S2, S3, S4, and S5, in which S0 is a working state and S3-S5 may be deemed as of a power down state. Normally, a computer will turn off power output of USB ports thereof when the computer is switched into the power down state. In more detail, there is no power provided to USB port when in S4 and S5, and there is possibly limited power when in S3, very low current which is not enough to be used for charging. In other words, USB ports of a computer have no or almost no power output when the computer is in the power down state. However, some users may still require the power output of USB ports when they switch their computers into the power down state, for example, using USB ports to charge batteries of portable apparatuses such as mobile phones, MP3 players, tablet PCs, etc.

To satisfy this requirement, some computers adopt modified design of USB power. In such a computer 7, as shown in FIG. 1, a charging controller 722 is disposed in a motherboard 72 to control a specific USB port 723. The charging controller 722 and the CPU are in the same motherboard 72. The CPU 721 outputs a power state signal to the charging controller 722 to indicate a power state of the system. On the other hand, the charging controller 722 acquires power from the power supply 71 of the computer 7. In this figure, the broken line between the power supply 71 and charging controller 722 stands for a power line. As a result, the charging controller 722 can keep supplying power to the specific USB port 723 when the computer has been switched into the power down mode because the charging controller 722 is aware of the power state. Thus, users may utilize the specific USB port 723 to charge a battery even when the computer 7 has been into the power down state. This function can be achieved only by a specialized motherboard 72. However, a specialized motherboard is much more expensive than a standard one in manufacturing cost.

However, not all computers have such a special design. A normally standard motherboard without the specific USB port cannot charge a battery any longer when the computer has been in the power down state. This is a problem to be solved. Some computer system manufactures who prefer to adopt standard motherboards must meet this problem if they don't or can't adopt the specialized motherboard. These manufactures usually use an input/output (I/O) module, such as a card reader, to connect a standard motherboard for increasing I/O ability. Thus, an I/O module with a power-uninterruptible USB port will be an economic and effective solution for these manufactures. Unfortunately, such an I/O module has never appeared in the market.

SUMMARY OF THE INVENTION

An object of the invention is to provide a USB input/output (I/O) module having a USB port with uninterruptible power output when the computer connected by the I/O module is in the power down state.

To accomplish the object, the I/O module of the invention for connecting a computer with a first USB port and a second USB port includes an I/O controller connecting the first USB port, a charging controller connecting the second USB port and a third USB port connecting the charging controller. The I/O controller determines what a power state of the computer is according to communication between the first USB port and the I/O controller and then sends a control signal depending upon the power state to the charging controller. The charging controller changes the third USB port into a pure charger mode without data transfer or a normal mode according to the control signal.

DETAILED DESCRIPTION OF THE INVENTION

Figure 1:
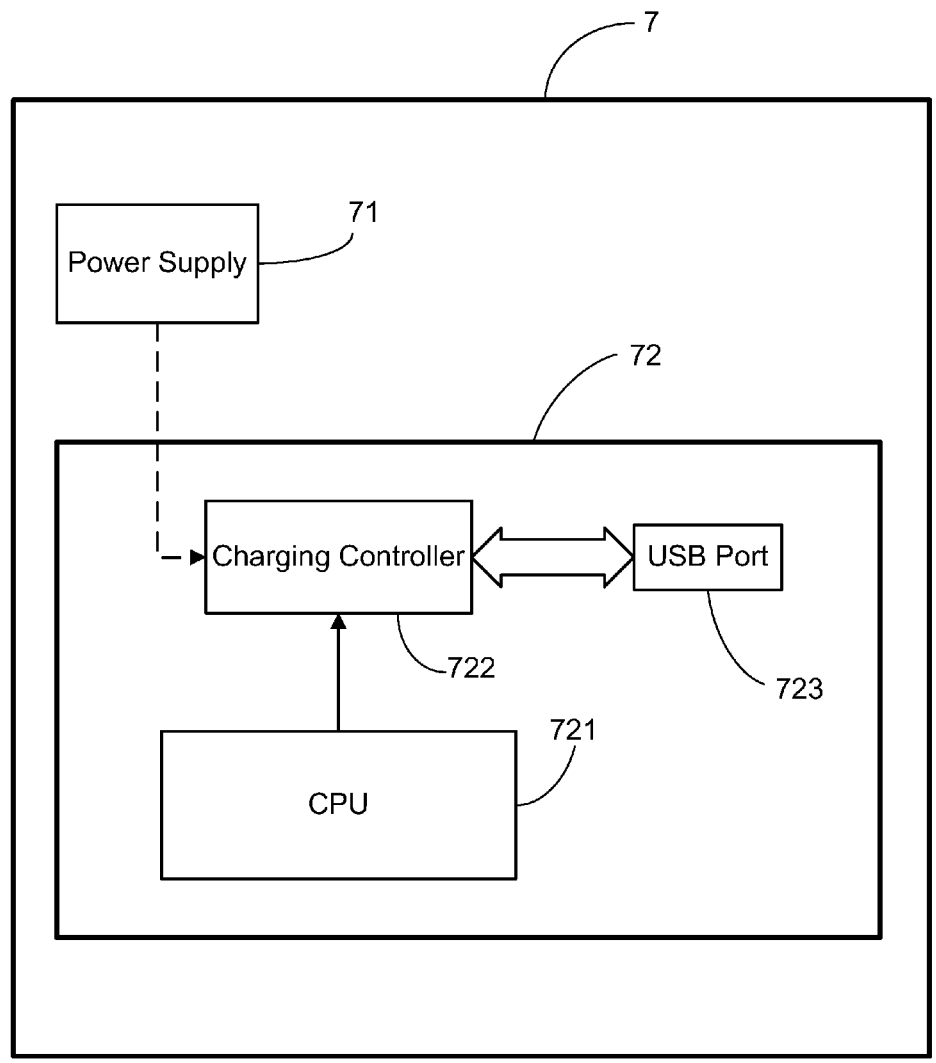
FIG. 1 is a conceptual block diagram of a conventional computer with a power-interruptible power USB port.
Figure 2:
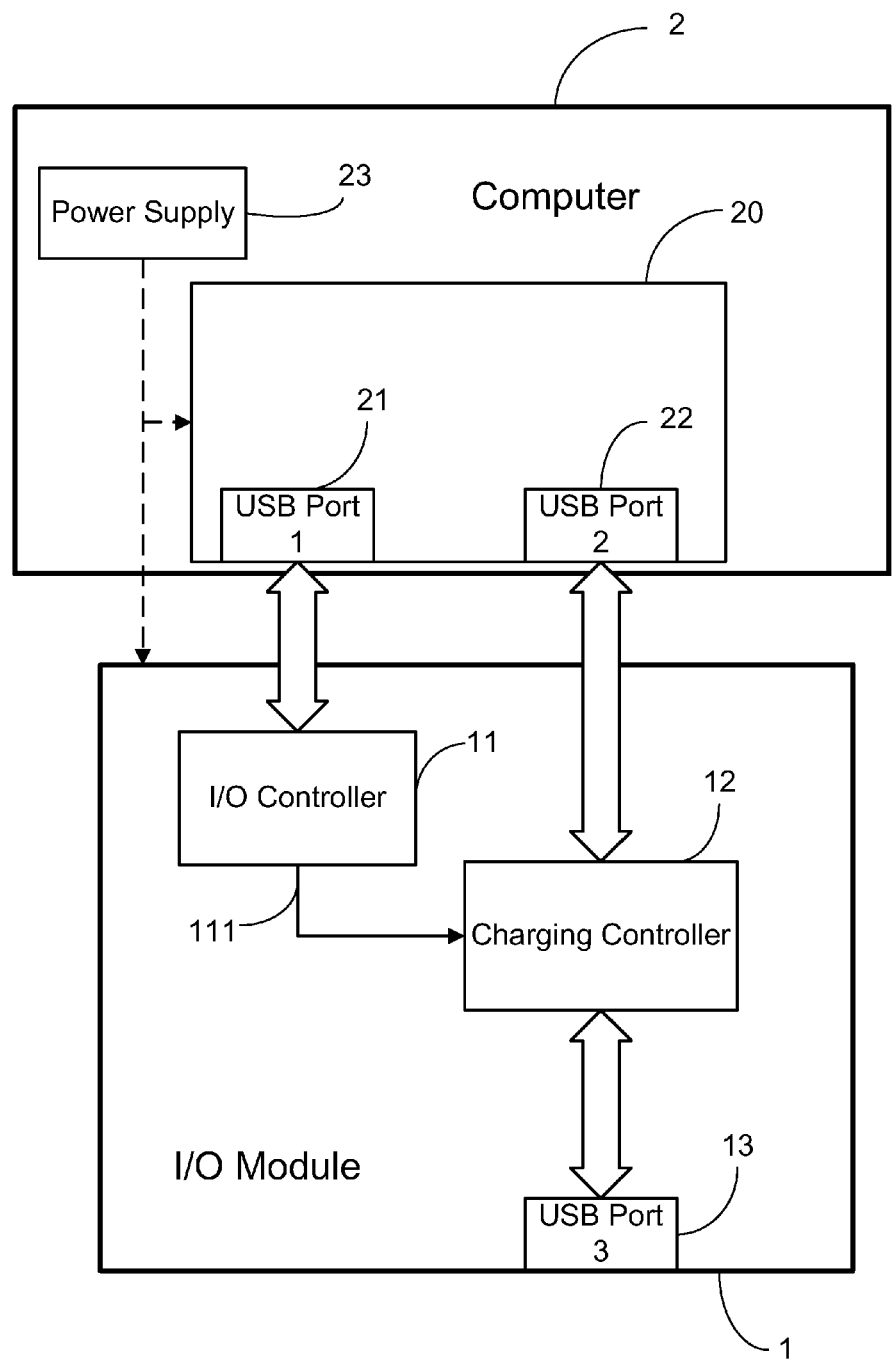
FIG. 2 is a conceptual block diagram of the invention.

Please refer to FIG. 2. The input/output (I/O) module 1 of the invention is used for connecting a normal motherboard 20 of a computer 2. The motherboard 20 is provided with several universal serial bus (USB) ports on board including a first USB port 21 and a second USB port 22. Preferably, the I/O module 1 may be a card reader. The I/O module 1 includes an I/O controller 11, a charging controller 12 and a third USB port 13. The I/O module 1 is powered by a power supply 23 of the computer 2. That is to say, the power supply 23 can continuously provide power to the I/O controller 11 and the charging controller 12. Preferably, the I/O module 1 is an independent piece from the motherboard 20 and is installed in a housing of the computer 2. Practically, the I/O module 1 may be deemed as a part of the computer 2 once the I/O module 1 has been installed in the computer 2.

The I/O controller 11 is electrically connected to the first USB port 21 and has a control signal output pin 111. The I/O controller 11 is a control center of the I/O module 1 for operation. Besides this primary function of control center, the I/O controller 11 is further programmed to be capable of detecting a power state of the computer 2. The power state can be determined by whether communication between the I/O controller 11 and the computer 2 exists or not. In more detail, the I/O controller 11 determines that the computer 2 is in either of two power states, which are a working state and a power down state, according to communication between the first USB port 21 and the I/O controller 11. The working state may be the S0 state of the ACPI and the power down state may be one of the S3, S4 and S5 states. The computer 2 is defined in the working state and power down state if the communication appears and disappears, respectively. The I/O controller 11 will sends out a control signal depending upon one of the power states to the charging controller 12 via the control signal output pin 111.

The charging controller 12 is separately electrically connected to the second USB port 22 and the control signal output pin 111 of the I/O controller 11. The third USB port 13 is electrically connected to the charging controller 12. Power and data transfer of the third USB port 13 is completely controlled by the charging controller 12. The charging controller 12 and I/O controller 11 are electrically powered by the power supply 23 of the computer 2 so that the charging controller 12 can continuously supply power from the power supply 23 to the third USB port 13 even when the computer 2 is in the power down state, such as S3, S4 or S5 state according to the Advanced Configuration and Power Interface (ACPI) specification, which largely limits or turns off the power of the first and second USB ports 21, 22.

The control signal from the I/O controller 11 is sent to the charging controller 12. The charging controller 12 will change the third USB port 13 into a pure charger mode or a normal mode according to the control signal. The pure charger mode means that the third USB port 13 has only power output without data transfer function and the normal mode means that the third USB port 13 is in a normal status with both power output and data transfer function.

When the computer 2 is changed into the power down state, communication between the first USB port 21 and the I/O controller 11 will disappear and the I/O controller 11 determines that the computer 2 is in the power down state and sends the control signal to the charging controller 12, and finally the charging controller 12 will provide electric power to the third USB port 13 so as to use for charging a battery. When the computer 2 is changed into the working state, communication between the first USB port 21 and the I/O controller 11 will appear and the I/O controller 11 determines that the computer 2 is in the working state and sends the control signal to the charging controller 12, and finally the charging controller 12 will completely connect the second USB port 22 and the third USB port 13 so as to keep the third USB port 13 normally operative. In sum, the third USB port 13 can still provide power to an external device when the computer 2 is in the power down state without supplying power to the first and second USB ports 21, 22, and the third USB port 13 keeps its original functions when the computer 2 is working.

While the forgoing is directed to an embodiment of the present invention, other and further embodiments of the invention may be devised without departing from the basic scope thereof. As such, the appropriate scope of the invention is to be determined according to the claims.

What is claimed is:

1. An input/output (I/O) module comprising:
an I/O controller, having a control signal output pin, and adapted to connect a first external universal serial bus (USB) port and to receive electric power from an external power supply;
a charging controller, electrically connected to the control signal output pin of the I/O controller, and adapted to receive electric power from the external power supply and to connect a second external universal serial bus (USB) port; and
a built-in USB port, electrically connected to the charging controller, and being under control thereof;
wherein the I/O controller sends a control signal through the control signal pin to the charging controller according to communication between the first external USB port and the I/O controller, the charging controller supplies electric power from the external power supply to the built-in USB port when the communication disappears, and the charging controller makes the built-in USB port operatively connect the second external USB port when the communication appears.

2. The I/O module of claim 1, wherein the I/O module is a card reader.

3. A computer comprising:
a motherboard having a first universal serial bus (USB) port and a second USB port, and
an input/output (I/O) module comprising:
an I/O controller, electrically connected to the first USB port, and having a control signal output pin;
a charging controller, separately electrically connected to the second USB port and the control signal output pin of the I/O controller; and
a third USB port, electrically connected to the charging controller; and
a power supply for supplying electric power to the motherboard and the I/O module;
wherein the I/O controller determines whether or not the motherboard is in a power down state according to communication between the first USB port and the I/O controller and then sends a control signal depending upon the power down state to the charging controller, and the charging controller supplies electric power from the power supply to the third USB port when the motherboard is in the power down state.

4. The computer of claim 3, wherein the I/O module is a card reader.

5. The computer of claim 3, wherein the power down state is S3, S4 or S5 state according to the Advanced Configuration and Power Interface (ACPI) specification.

6. The computer of claim 3, wherein the I/O module is an independent piece from the motherboard.

* * * * *